United States Patent
Shih et al.

(10) Patent No.: US 11,741,982 B2
(45) Date of Patent: Aug. 29, 2023

(54) CONTEXTUAL BEAMFORMING TO IMPROVE SIGNAL-TO-NOISE RATIO SENSITIVE AUDIO INPUT PROCESSING EFFICIENCY IN NOISY ENVIRONMENTS

(71) Applicant: Dell Products L.P., Round Rock, TX (US)

(72) Inventors: Cola Hung Shih, Taipei (TW); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/494,512

(22) Filed: Oct. 5, 2021

(65) Prior Publication Data

US 2023/0109066 A1     Apr. 6, 2023

(51) Int. Cl.

| | |
|---|---|
| *G10L 21/0216* | (2013.01) |
| *G10L 17/00* | (2013.01) |
| *G10L 25/78* | (2013.01) |
| *G10L 25/30* | (2013.01) |
| *H04R 3/00* | (2006.01) |
| *H04R 5/04* | (2006.01) |
| *H04R 3/04* | (2006.01) |
| *G10L 21/0208* | (2013.01) |

(52) U.S. Cl.
CPC .......... *G10L 21/0216* (2013.01); *G10L 17/00* (2013.01); *G10L 25/30* (2013.01); *G10L 25/78* (2013.01); *H04R 3/005* (2013.01); *H04R 3/04* (2013.01); *H04R 5/04* (2013.01); *G10L 2021/02082* (2013.01); *G10L 2021/02166* (2013.01)

(58) Field of Classification Search
None
See application file for complete search history.

(56) References Cited

U.S. PATENT DOCUMENTS

| | | | | |
|---|---|---|---|---|
| 6,449,593 | B1* | 9/2002 | Valve | H04R 3/005 704/233 |
| 9,330,673 | B2* | 5/2016 | Cho | H04R 29/005 |
| 10,721,560 | B2* | 7/2020 | Alders | H04R 1/403 |
| 10,957,342 | B2 | 3/2021 | Reed et al. | |
| 11,363,544 | B1* | 6/2022 | Rohit Kumar | G10L 25/21 |
| 2021/0067872 | A1* | 3/2021 | Uchida | H04R 1/406 |
| 2021/0383803 | A1* | 12/2021 | Takimoto | G10L 15/22 |
| 2022/0217490 | A1* | 7/2022 | Lyren | G10L 25/81 |

FOREIGN PATENT DOCUMENTS

EP         0618566 A1    3/1994

* cited by examiner

*Primary Examiner* — Paul W Huber
(74) *Attorney, Agent, or Firm* — Larson Newman, LLP

(57) ABSTRACT

An audio processing system includes a microphone array, a speech detection system, and a neural network noise reduction module. The microphone array includes at least two microphones and provides an audio signal from an environment surrounding the microphone array. The speech detection system receives the audio signal, and processes the audio signal to a) detect that a first user is speaking, b) determine a first direction relative to the audio array when the first user is located at a first location within the environment, and c) provide beamforming processing on the audio signal in the first direction, and to provide a processed audio signal based upon the beamforming processing. The neural network noise reduction module reduces noise in the processed audio signal.

16 Claims, 4 Drawing Sheets

CONTEXTUAL BEAMFORMING TO IMPROVE SIGNAL-TO-NOISE RATIO SENSITIVE AUDIO INPUT PROCESSING EFFICIENCY IN NOISY ENVIRONMENTS

FIELD OF THE DISCLOSURE

This disclosure generally relates to information handling systems, and more particularly relates to providing contextual beamforming to improve signal-to-noise ratio sensitive audio input processing efficiency in noisy environments.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An audio processing system may include a microphone array, a speech detection system, and a neural network noise reduction module. The microphone array may include at least two microphones and may provide an audio signal from an environment surrounding the microphone array. The speech detection system may receive the audio signal, may process the audio signal to a) detect that a first user is speaking, b) determine a first direction relative to the audio array when the first user is located at a first location within the environment, and c) provide beamforming processing on the audio signal in the first direction, and may provide a processed audio signal based upon the beamforming processing. The neural network noise reduction module may reduce noise in the processed audio signal.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
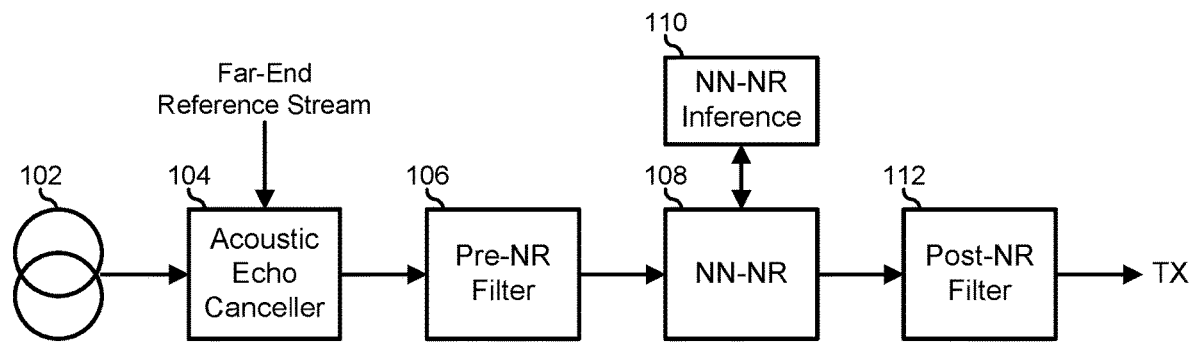
FIG. 1 is a block diagram illustrating a neural network-based noise reduction (NN-NR) audio processor as is known in the prior art.
Figure 1:
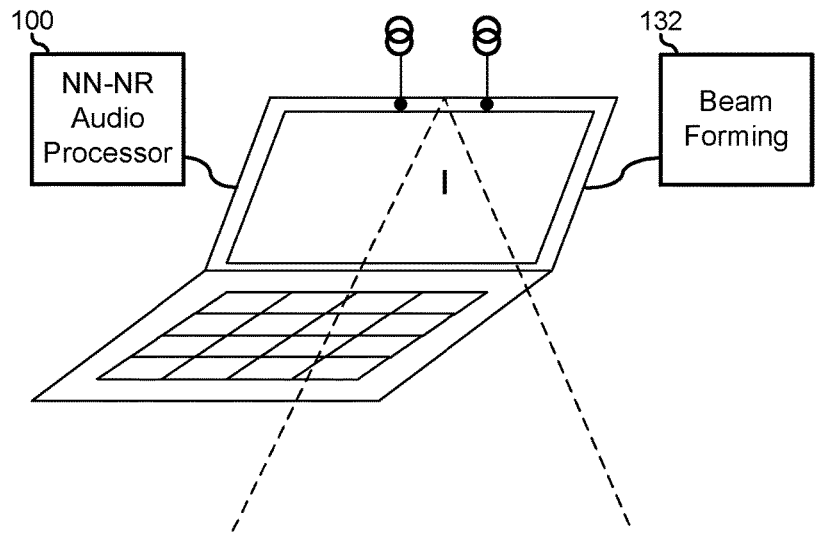

FIG. 1 illustrates a neural network-based noise reduction (NN-NR) audio processor 100 as is known in the prior art. Audio processor 100 includes a microphone array 102, an acoustic echo canceller module 104, a pre-noise reduction filtering module 106, a NN-NR module 108 that utilizes a NN-NR inference mask 110, and a post-noise reduction filtering module 112. Microphone array 102 represents one or more microphones arranged to pick up the sound in a particular environment. For example, a laptop computer 130 is depicted as having two microphones arranged on a cover of the laptop computer. Acoustic echo cancellation module 104 removes echoes, reverberation, and unwanted sounds that may be introduced into the audio signal from microphone array 102 due the acoustic space surrounding the microphone array. In particular, acoustic echo cancellation module 104 processes the audio signal form microphone array 102 through a digital signal processor (DSP) based upon an acoustic signal from the acoustic space, the far-end reference stream. An example of a DSP may include a finite impulse response (FIR) filter, or another DSP as needed or desired. Pre-noise reduction filtering module 106 receives the audio signal from microphone array 102 and removes echoes and reverberation from acoustic echo cancellation module 104 and performs various filtering and signal conditioning as needed or desired, prior to processing by NN-NR module 108.

NN-NR module 108 processes the filtered signal from pre-noise reduction filtering module 106 through a neural network deep learning algorithm to adaptively reduce the noise content from the signal and to produce a clearer voice signal. NN-NR module 108 is a trained neural network that is trained based upon a training data set that is utilized to produce NN-NR inference mask 110. As such, NN-NR module 108 implements a particular neural network algorithm that is typically implemented in hardware, such as one or more graphics processing unit (GPU), or that may be implemented in software and processed by a CPU. An example of a neural network algorithm may include a deep neural network (DNN), a convolution neural network (CNN), a long-short term memory (LSTM), a recurrent neural network (RNN), a generative adversarial network (GAN), a radial bias function network (RBFN), a multilayer perceptron (MLP), a self-organizing map (SOM), a deep-belief network (DBN), a restricted Boltzman machine (RBM), an autoencoder, or the like, as needed or desired. Post-noise reduction filtering module 112 provides any post processing, such as gain control, equalization, or other audio processing as needed or desired to provide the final output signal. The details of acoustic echo cancellation, neural networks, filtering, and other audio processing is known in the art and will not be further described herein except as needed to illustrate the current embodiments.

NN-NR audio processor 100 is effective at reducing unwanted noise from voice signals where the speech-to-noise ratio (SNR) is high: typically greater than 0 dB. However, where the SNR is less than 0 dB, NN-NR audio processor 100 is less effective at reducing the unwanted noise. For this reason, laptop computer 130 includes beamforming module 132 that performs spatial signal processing on the microphone array inputs to increase the signal strength from audio sources directly in front of the laptop computer screen, and to decrease the signal strength from audio sources that are not in front of the laptop computer. Beamforming module 132 operates on the outputs from microphone array 102 to filter the outputs and combine the filtered signals to increase the desired signal, via, e.g., constructive combining of the outputs, and to decrease the undesired signal, via, e.g., destructive combining of the outputs. An example of a beamforming filter may include a Finite Impulse Response (FIR) filter, or another filter as needed or desired.

It has been understood that current usage models for working from home are providing greater flexibility in the location of the user of information handling systems to be located at a wider variety of locations with respect to a microphone array located on the information handling system. In particular, a laptop computer may act as a base, and a user may have a monitor and human input devices (HIDs) that are remote from the laptop computer. Thus the legacy beamforming algorithms typically employed in an information handling system, that assume that the user is directly in front of the information handling system, may not adequately increase the signal strength of an audio source that is not located where expected by the algorithm. Even where the laptop computer is utilized as the monitor and HIDs, the increased usage of remote conferencing systems means that users may "wander" around their environment, making the beamforming algorithm less effective. Moreover, where adaptive beamforming algorithms are utilized, which can adaptively rotate the beam angle to the largest human voice location, such adaptive beamforming may not be centered on the correct user's location in noisy environments, such as where other people are chatting in the background. Other audio input processing algorithms, such as de-reverberation, may likewise be subject to poor performance when the SNR of the input audio is low.

Figure 2:
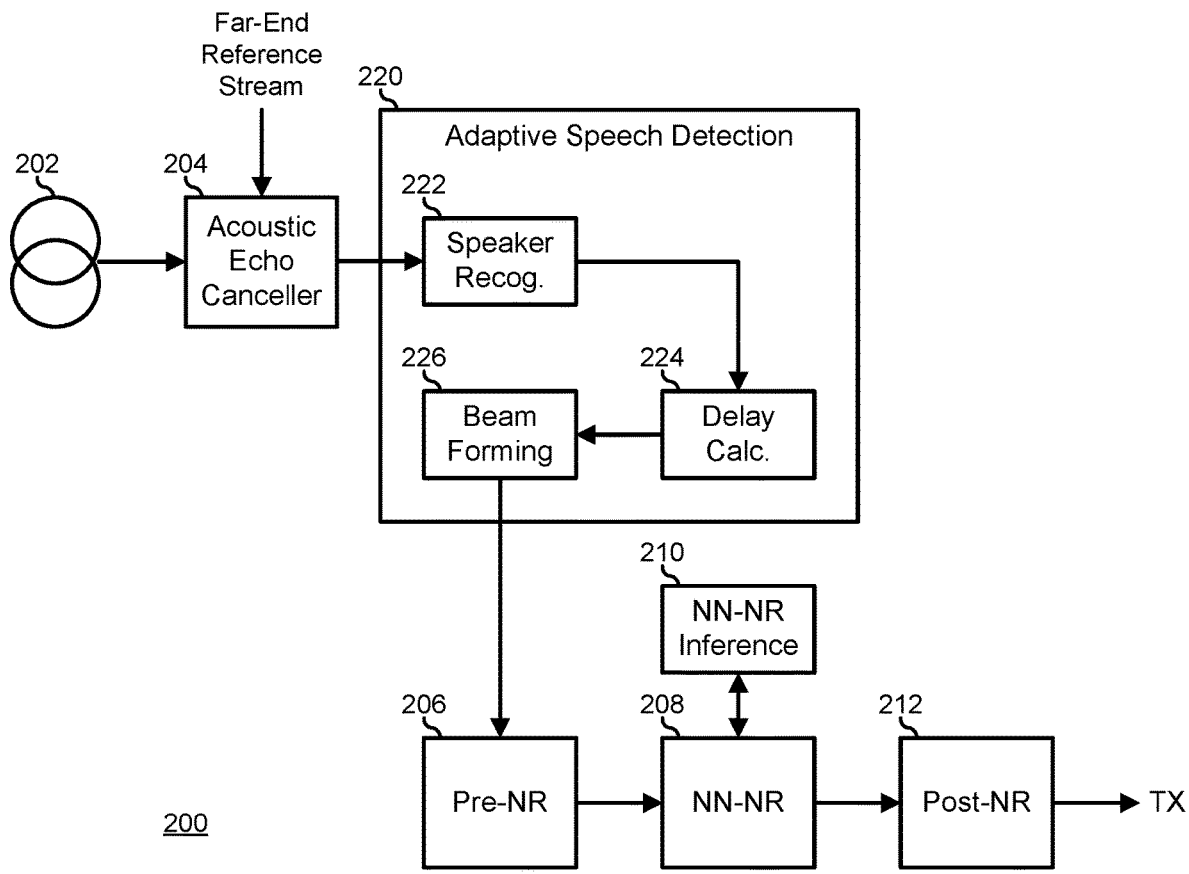
FIG. 2 is a block diagram illustrating an NN-NR audio processor according to an embodiment of the current disclosure.
Figure 2:
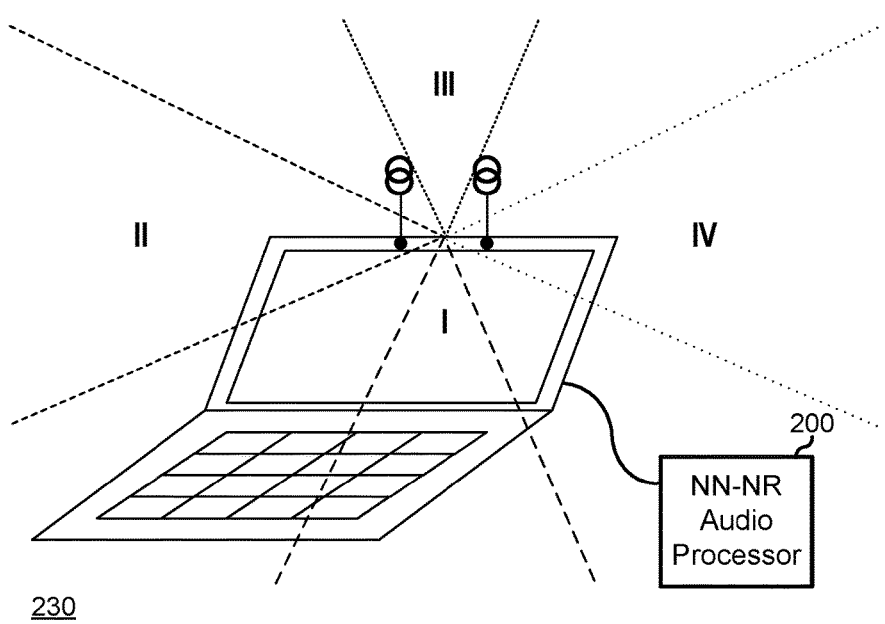

FIG. 2 illustrates a NN-NR audio processor 200 similar to NN-NR audio processor 100. Audio processor 200 includes a microphone array 202, an acoustic echo canceller module 204, a pre-noise reduction filtering module 206, a NN-NR module 208 that utilizes a NN-NR inference mask 210, a post-noise reduction filtering module 212, and an adaptive speech detection module 220. Microphone array 202 is similar to microphone array 102, and represents two or more microphones arranged to pick up the sound in a particular environment. Acoustic echo cancellation module 204 is similar to acoustic echo cancellation module 104, and removes echoes and reverberation due the acoustic space surrounding microphone array 202. Adaptive speech detection module 220, described below, receives the output from acoustic echo cancellation module 204 and provides a conditioned audio signal to pre-noise reduction filtering module 206 that operates similarly to pre-noise reduction filtering module 106. NN-NR module 208 is similar to NN-NR module 108 and processes the filtered signal through a neural network deep learning algorithm based upon NN-NR inference mask 210. Post-noise reduction filtering module 212 is similar to post-noise reduction filtering module 112, and provides any post processing as needed or desired.

Adaptive speech detection module 220 includes a speaker recognition module 222, a delay calculation module 224, and a beamforming module 226. Adaptive speech detection module 220 operates to determine when the audio signal includes speech from a particular user or a small number of users, and to adaptively provide beamforming processing on the audio signal to enhance the audio signal from the recognized user or users based upon their locations in the ambient environment. As such, speaker recognition module 222 operates to determine that a particular speaker's speech pattern is discernable in the audio signal from the ambient environment. In a particular embodiment, speaker recognition module 222 operates in an initialization mode to receive predetermined speech inputs from one or more user to train the speaker recognition module on the particular speech characteristics of the users, so that, in a runtime mode, the speaker recognition module can determine when a characterized user is speaking.

Speaker recognition module 222 may utilize any suitable algorithm or system for performing the speaker recognition functions as described herein, including, but not limited to a frequency estimation algorithm, a hidden Markov model, a Gaussian mixture model, a pattern matching algorithm, a neural network algorithm, a matrix representation algorithm, a vector quantization algorithm, a decision tree algorithm, another speaker recognition algorithm or model, or the like. Where multiple users are characterized, speaker recognition module 222 may utilize a speaker diarization model as needed or desired to distinguish between the multiple users voices. In a particular embodiment, speaker recognition module 222 provides an anti-speaker technique such as a cohort model or the like.

When a speaker is identified in the audio signal, delay calculation module 224 operates to detect the delay in the received audio signal from the multiple microphones of microphone array 202, and beamforming module 226 performs adaptive spatial signal processing on the microphone array inputs to increase the signal strength recognized voices, whether they are directly in front of the laptop computer screen or in other spatial orientations with the microphone array. Moreover, as a speaker moves around the acoustic space, adaptive speech detection module 220 operates to continuously increase the signal strength from recognized speakers and to decrease the signal strength from other audio sources.

Figure 3:
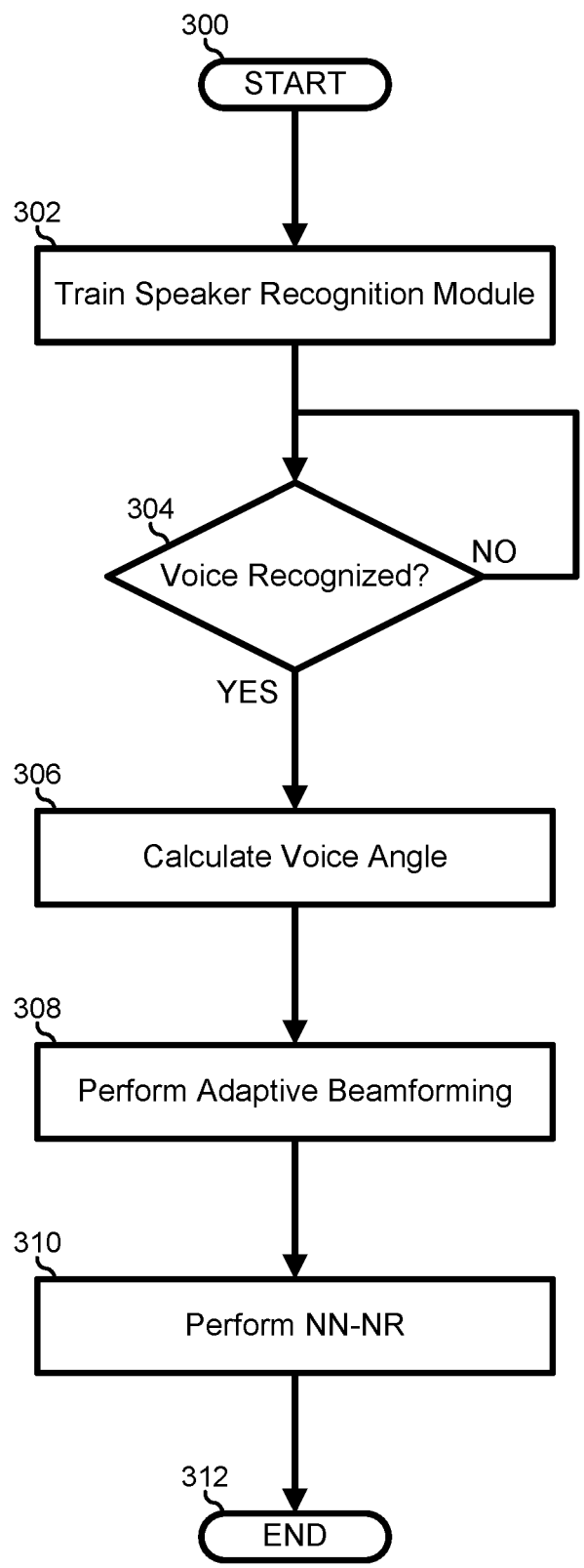
FIG. 3 is a flow diagram illustrating a method for providing contextual beamforming to improve signal-to-noise ratio sensitive audio input processing efficiency in noisy environments according to an embodiment of the current disclosure.

FIG. 3 illustrates a method for providing contextual beamforming to improve signal-to-noise ratio sensitive audio input processing efficiency in noisy environments, starting at block 300. A speaker recognition module of an adaptive speech detection module is trained to one or more users voice in block 302, and a decision is made as to whether or not the characterized voice is detected in an audio signal from a microphone array in decision block 304. If not, the "NO" branch of decision block 304 is taken and the method loops through decision block 304 until a voice is recognized. When a voice is recognized, the "YES" branch of decision block 304 is taken and a delay calculation module of the adaptive speech detection module determines a voice angle to the microphone array in block 306. A beamforming module of the adaptive speech detection module enhances the audio signal of the recognized voice in block 308, a NN-NR reduces noise in the audio signal in block 310, and the method ends in block 312.

Figure 4:
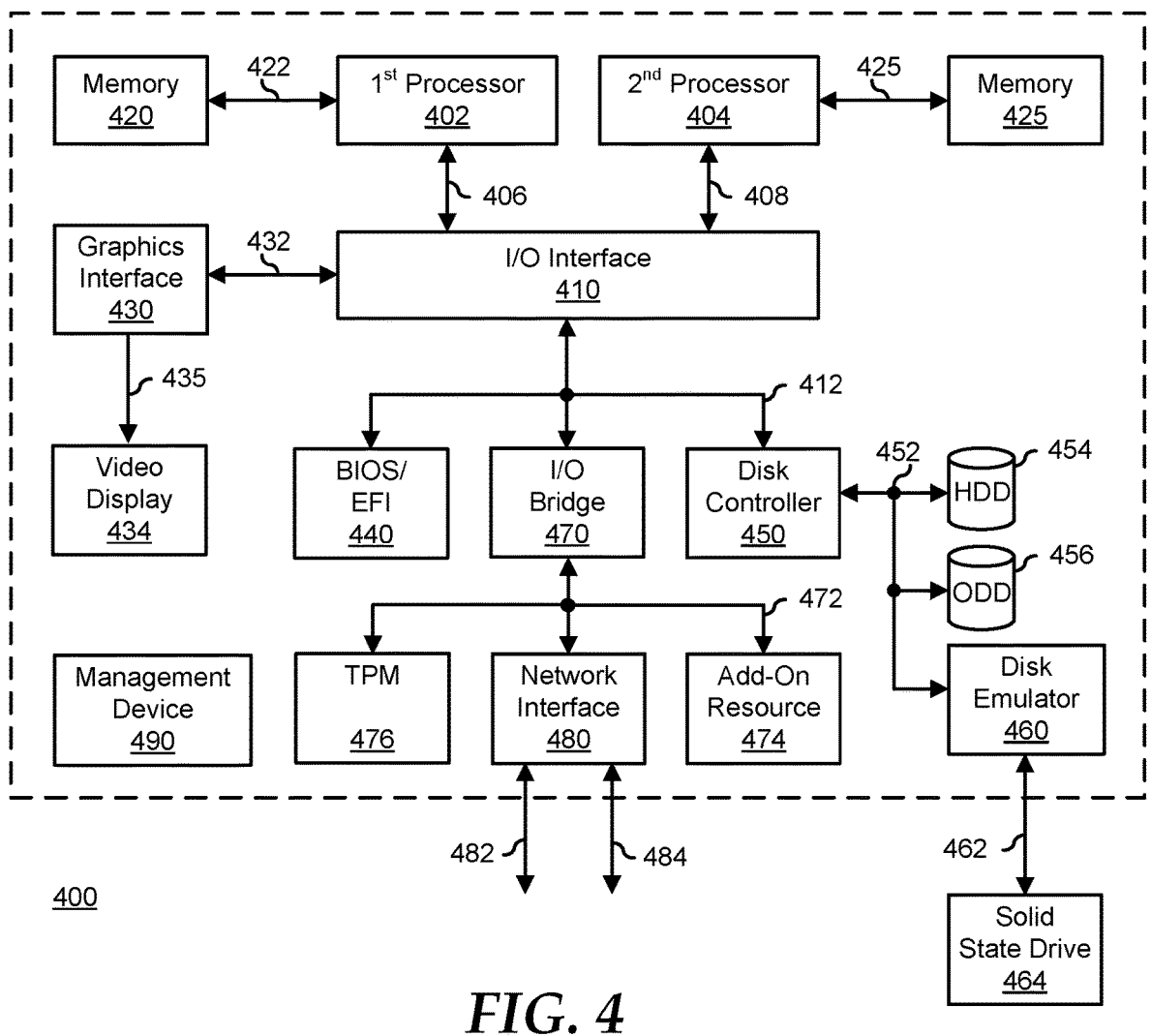
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, and a management device 490. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 435 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An audio processing system, comprising:
a microphone array including at least two microphones and configured to provide an audio signal from an environment surrounding the microphone array; and
a speech detection system configured to receive the audio signal, and to process the audio signal to a) characterize a first voice of a first user and a second voice of a second user, b) detect that the first user is speaking utilizing a speaker diarization model to distinguish the first voice from the second voice, c) determine a first direction relative to the audio array when the first user is located at a first location within the environment, d) provide beamforming processing on the audio signal in the first direction, and e) provide a processed audio signal based upon the beamforming processing
wherein the audio processing system is configured to reduce noise in the processed audio signal.

2. The audio processing system of claim 1, wherein the speech detection system is further configured to determine that the first user has moved form the first location within the environment to a second location within the environment.

3. The audio processing system of claim 2, wherein the speech detection system is further configured to determine a second direction relative to the audio array when the first user is located at the second location.

4. The audio processing system of claim 3, wherein the speech detection system is further configured to provide beamforming processing on the audio signal in the second direction.

5. The audio processing system of claim 1, wherein the speech detection system is further configured to process the audio signal to a) detect that the second user is speaking, b) determine a third direction relative to the audio array when the second user is located at a third location within the environment, and c) provide beamforming processing on the audio signal in the third direction.

6. The audio processing system of claim 1, wherein, in determining the first direction, the speech detection system is further configured to determine a time delay in the audio signal between the microphones of the microphone array.

7. The information handling system of claim 1, wherein, in detecting that the first user is speaking, the speech detection system utilizes a voice identification algorithm including at least one of a frequency estimation algorithm, a pattern matching algorithm, a neural network algorithm, a matrix representation algorithm, a vector quantization algorithm, and a decision tree algorithm.

8. A method comprising:
providing, by a microphone array of an audio processing system, an audio signal from an environment surrounding the microphone array, wherein the microphone array includes at least two microphones;

characterizing a first voice of a first user and a second voice of a second user;

processing the audio signal to a) detect that the first user is speaking utilizing a speaker diarization model to distinguish the first voice from the second voice, b) determine a first direction relative to the audio array when the first user is located at a first location within the environment, and c) provide beamforming processing on the audio signal in the first direction;

providing a processed audio signal based upon the beamforming processing; and reducing noise in the processed audio signal.

9. The method of claim 8, further comprising determining that the first user has moved form the first location within the environment to a second location within the environment.

10. The method of claim 9, further comprising determining a second direction relative to the audio array when the first user is located at the second location.

11. The method of claim 10, further comprising providing beamforming processing on the audio signal in the second direction.

12. The method of claim 8, wherein detecting that the first user is speaking is based upon the characterization of the first voice.

13. The method of claim 8, further comprising processing the audio signal to a) detect that the second user is speaking, b) determine a third direction relative to the audio array when the second user is located at a third location within the environment, and c) provide beamforming processing on the audio signal in the third direction.

14. The method of claim 8 wherein, in detecting that the first user is speaking, the method further comprises utilizing at least one of a frequency estimation algorithm, a pattern matching algorithm, a neural network algorithm, a matrix representation algorithm, a vector quantization algorithm, and a decision tree algorithm.

15. An information handling system, comprising:
a microphone array including at least two microphones and configured to provide an audio signal from an environment surrounding the microphone array; and
a processor configured to provide an audio processing system including:
a speech detection system configured to receive the audio signal, and to process the audio signal to a) characterize a first voice of a first user and a second voice of a second user, b) detect that the first user is speaking utilizing a speaker diarization model to distinguish the first voice from the second voice, c) determine a first direction relative to the audio array when the first user is located at a first location within the environment, d) provide beamforming processing on the audio signal in the first direction, and e) provide a processed audio signal based upon the beamforming processing; and
a neural network noise reduction module configured to reduce noise in the processed audio signal.

16. The information handling system of claim 15, wherein, in detecting that the first user is speaking, the speech detection system utilizes a voice identification algorithm including at least one of a frequency estimation algorithm, a pattern matching algorithm, a neural network algorithm, a matrix representation algorithm, a vector quantization algorithm, and a decision tree algorithm.

* * * * *